(12) United States Patent
Horiuchi (10) Patent No.: US 8,186,477 B2
(45) Date of Patent: May 29, 2012

(54) REAR-WHEEL STEERING VEHICLE

(75) Inventor: Yutaka Horiuchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 58 days.

(21) Appl. No.: 12/742,352

(22) PCT Filed: Aug. 22, 2008

(86) PCT No.: PCT/JP2008/002279
§ 371 (c)(1),
(2), (4) Date: Jun. 15, 2010

(87) PCT Pub. No.: WO2009/069242
PCT Pub. Date: Jun. 4, 2009

(65) Prior Publication Data
US 2010/0263961 A1 Oct. 21, 2010

(30) Foreign Application Priority Data

Nov. 26, 2007 (JP) ................................. 2007-304193

(51) Int. Cl.
*B62D 5/04* (2006.01)
*B62D 5/06* (2006.01)

(52) U.S. Cl. ........ 180/445; 180/411; 180/412; 180/413; 180/414; 701/41

(58) Field of Classification Search .................. 180/408, 180/411, 412, 413, 414, 415, 416, 445; 701/41
See application file for complete search history.

(56) References Cited

U.S. PATENT DOCUMENTS

| 4,941,542 A | * | 7/1990 | Tomoda et al. | ............... | 180/414 |
| 5,143,400 A | * | 9/1992 | Miller et al. | ............... | 280/5.522 |
| 5,147,008 A | * | 9/1992 | Nishimore et al. | ........... | 180/414 |

FOREIGN PATENT DOCUMENTS

| JP | 62-120274 A | 6/1987 |
| JP | 63-192663 A | 8/1988 |
| JP | 2-227380 A | 9/1990 |
| JP | 3-110891 U | 11/1991 |
| JP | 6092252 A | 4/1994 |

(Continued)

*Primary Examiner* — Kevin Hurley
*Assistant Examiner* — Marc Scharich
(74) *Attorney, Agent, or Firm* — Arent Fox LLP (57) ABSTRACT

The present invention provides a rear wheel toe angle variable control system-equipped vehicle that is capable of assisting the steering of the front wheels by a power steering system mounted therein without deteriorating the steering feeling experienced by the vehicle operator even when the rear wheels have been steered. The rear wheel steering vehicle (1) of the present invention comprises a steering wheel (11) for steering right and left front wheels (4R, 4L), a power steering system (16) for providing an assist force so as to assist steering of the right and left front wheels (4R, 4L) according to operation of the steering wheel (11), and a rear wheel toe angle variable control system (20) for changing toe angles of right and left rear wheels (6R, 6L) in a same or opposite phase relationship relative to the right and left front wheels (4R, 4L) or in a toe-in or toe-out relationship by individually controlling actuation of right and left actuators (21R, 21L) mounted for the right and left rear wheels (6R, 6L), respectively, wherein the power steering system (16) changes the assist force according to the toe angles of the right and left rear wheels (6R, 6L).

4 Claims, 4 Drawing Sheets

FOREIGN PATENT DOCUMENTS

| | | |
|---|---|---|
| JP | 7-52818 A | 5/1995 |
| JP | 9-30438 A | 2/1997 |
| JP | 9030438 A | 2/1997 |
| JP | 11-48997 A | 2/1999 |
| JP | 11-255138 A | 9/1999 |
| JP | 2006-315633 A | 11/2006 |

* cited by examiner

- start
- ST1: calculate vehicle speed V
- ST2: calculate front wheel steering angle $\delta f$ generated by vehicle operator
- ST3: calculate target toe angle for each rear wheel based on vehicle speed V and front wheel steering angle $\delta f$
- ST4: give target toe angle to corresponding rear wheel
- ST5: calculate steering torque generated by vehicle operator
- ST6: calculate assist rate according to vehicle speed V
- ST7: calculate base assist torque
- ST8: calculate additional correction torque
$$\xi \frac{1}{1+AV^2}\left(\frac{L_r}{L}m\right)\frac{1}{L}\delta_r$$
- ST9: correct base assist torque using additional correction torque and generate ESP torque
- return

*Fig.4* rear wheel steering angle $\delta_r = (\theta_L + \theta_R)/2$ (same phase relationship relative to the front wheels : +
opposite phase relationship relative to the front wheels : −)

(A)

total toe angle $\theta = \theta'_R + \theta'_L$ (inward : +
outward : −)

REAR-WHEEL STEERING VEHICLE

CROSS-REFERENCED TO RELATED APPLICATION

This application is a National Stage entry of International Application No. PCT/JP2008/002279, filed Aug. 22, 2008, which claims priority to Japanese Patent Application No. 2007-304193 filed Nov. 26, 2007, the disclosure of the prior application is incorporated in its entirety by reference.

TECHNICAL FIELD

The present invention relates to a rear wheel steering vehicle equipped with a rear wheel toe angle variable control system, and in particular to a technology for adjusting steering assist force according to toe angles of rear wheels in a rear wheel steering vehicle equipped with a power steering system.

BACKGROUND OF THE INVENTION

As a rear wheel toe angle variable control system for vehicles, there is known one that is configured to individually change the toe angles of the right and left rear wheels by individually extending and retracting right and left actuators connecting knuckles of the right and left rear wheels to the vehicle body (for example, see Japanese patent laid open publication (kokai) No. 09-30438).

A number of vehicles are provided with an electric power steering system comprising an electric motor for generating steering assist force so as to reduce the steering effort of the vehicle operator. Such an electric power steering system is generally configured to improve the driving stability of the vehicle by controlling the assist force generated by the electric motor such that the assist force increases as the vehicle behavior becomes more pronounce (as the yaw rate increases) (for example, see Japanese patent No. 3110891).

However, a vehicle having both of the rear wheel toe angle variable control system disclosed in the Japanese patent laid open publication (kokai) No. 09-30438 and the electric power steering system disclosed in the Japanese patent No. 3110891 causes steering feeling different from that of other vehicles, and thus a discomfort to the vehicle operator due to the steering of the rear wheels.

The present invention was conceived in view of such a problem of the prior art, and its main object is to provide a rear wheel toe angle variable control system-equipped vehicle that is capable of assisting the steering of the front wheels without deteriorating the steering feeling experienced by the vehicle operator even when the rear wheels are steered.

BRIEF SUMMARY OF THE INVENTION

To solve the above-mentioned problems, the present invention provides a rear wheel steering vehicle, comprising: a steering wheel for steering right and left front wheels; a power steering system for providing an assist force so as to assist steering of the right and left front wheels according to operation of the steering wheel; and a rear wheel toe angle variable control system for changing toe angles of right and left rear wheels in a same or opposite phase relationship relative to the right and left front wheels or in a toe-in or toe-out relationship by individually controlling actuation of right and left actuators mounted for the right and left rear wheels, respectively, wherein the power steering system changes the assist force according to the toe angles of the right and left rear wheels.

In addition, in the rear wheel steering vehicle of the present invention, preferably, when the rear wheel toe angle variable control system has changed the toe angles of the right and left rear wheels in the same phase relationship relative to the right and left front wheels, the power steering system increases the assist force compared to when no toe angle is given to the right and left rear wheels, and when the rear wheel toe angle variable control system has changed the toe angles of the right and left rear wheels in the opposite phase relationship relative to the right and left front wheels, the power steering system decreases the assist force compared to when no toe angle is given to the right and left rear wheels.

In this case, preferably, the power steering system increases an extent of the increase or decrease in the assist force according to increase in absolute values of the toe angles of the right and left rear wheels.

In addition, in the rear wheel steering vehicle of the present invention, preferably, when the rear wheel toe angle variable control system has changed the toe angles of the right and left rear wheels in the toe-in relationship, the power steering system increases the assist force compared to when no toe angle is given to the right and left rear wheels, and when the rear wheel toe angle variable control system has changed the toe angles of the right and left rear wheels in the toe-out relationship, the power steering system decreases the assist force compared to when no toe angle is given to the right and left rear wheels.

In this case, preferably, the power steering system increases an extent of the increase or decrease in the assist force according to increase in a sum of absolute values of the toe angles of the right and left rear wheels.

According to the present invention, as the power steering system changes the assist force according to the toe angles of the right and left rear wheels, the steering feeling experienced by the vehicle operator during steering operation can be prevented from being deteriorated even if the toe angles of the right and left rear wheels have been changed. In addition, by increasing the assist force when the toe angles of the rear wheels have been changed in the same phase relationship relative to the front wheels and decreasing the assist force when the toe angles of the rear wheels have been changed in the opposite phase relationship relative to the front wheels, and by increasing the assist force when the toe angles of the rear wheels have been changed in the toe-in relationship and decreasing the assist force when the toe angles of the rear wheels have been changed in the toe-out relationship, the steering feeling experienced by the vehicle operator can be improved. Moreover, by increasing the extent of the increase or decrease in the assist force according to the increase in the absolute values of the toe angles of the right and left rear wheels when the toe angles of the rear wheels have been changed in the same or opposite phase relationship relative to the front wheels, and by increasing the extent of the increase or decrease in the assist force according to the increase in the sum of the absolute values of the toe angles of the right and left rear wheels when the toe angles of the right and left rear wheels have been changed in the toe-in or toe-out relationship, the vehicle operator can experience the same steering feeling as when the toe angles of the rear wheels have not been changed.

DETAILED DESCRIPTION OF THE PREFERRED EMBODIMENTS

An embodiment of the rear wheel steering vehicle of the present invention equipped with a rear wheel toe angle variable control system is described below in detail with reference to accompanying drawings. In the description, wheels and members provided for the wheels (such as tires and extensible actuators) each are indicated with a number and an additional letter R or L representing right or left, respectively. For example, rear wheels each are indicated as rear wheel 6R (right) or rear wheel 6L (left), and collectively as rear wheels 6.

Figure 1:
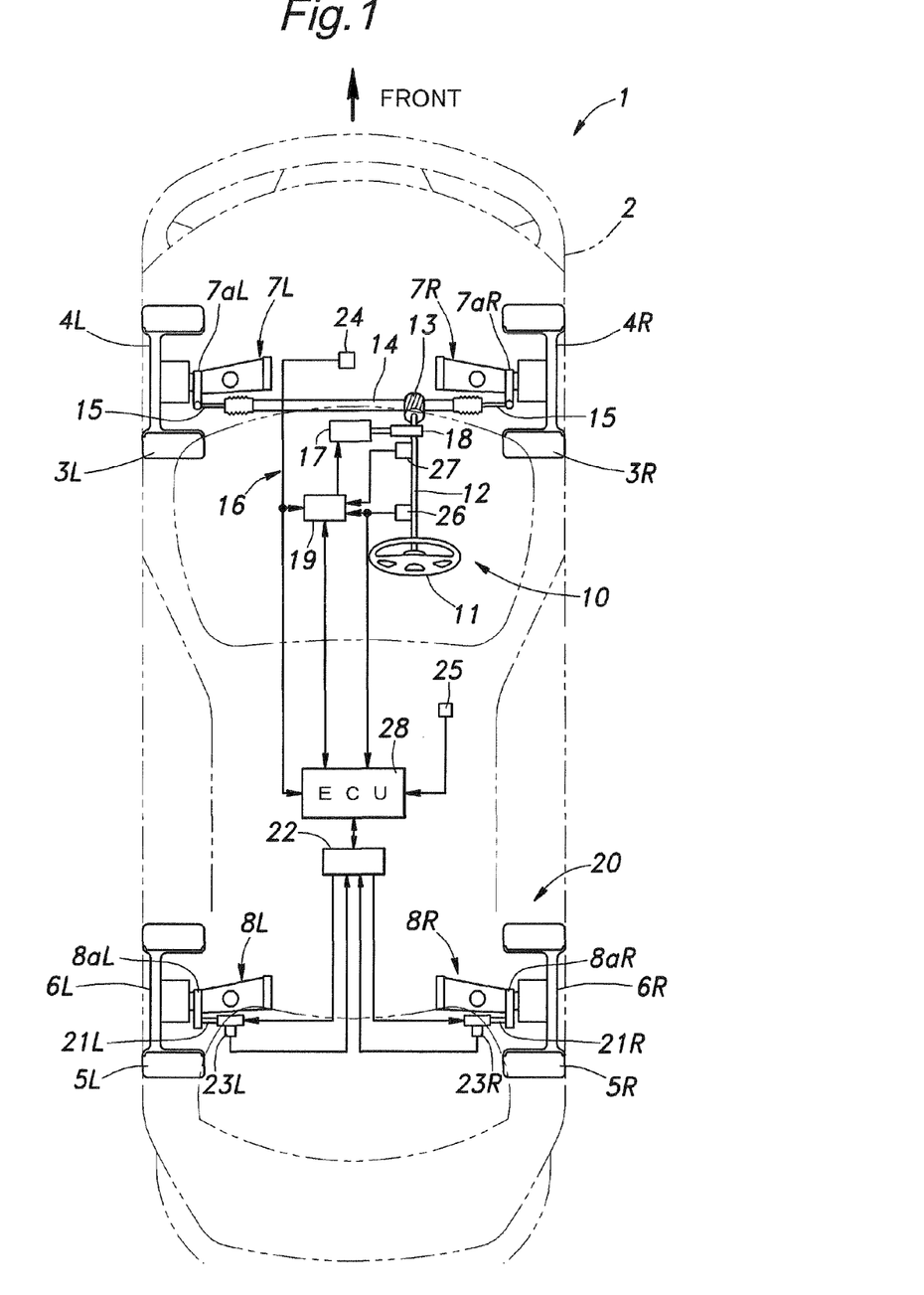
FIG. 1 is a schematic configuration diagram of the rear wheel steering vehicle of the present invention.

FIG. 1 is a configuration diagram showing an embodiment of the rear wheel steering vehicle 1 of the present invention equipped with a rear wheel toe angle variable control system 20. The vehicle 1 comprises a vehicle body 2, right and left front wheels 4R and 4L, right and left front suspensions 7R and 7L suspending the right and left front wheels 4R and 4L, respectively, from the vehicle body 2, tires 3R and 3L mounted on the front wheels 4R and 4L, respectively, right and left rear wheels 6R and 6L, right and left rear suspensions 8R and 8L suspending the rear wheels 6R and 6L, respectively, from the vehicle body 2, and tires 5R and 5L mounted on the rear wheels 6R and 6L, respectively. The front wheels 4R and 4L, and the rear wheels 6R and 6L are rotatbly supported by knuckles 7aR and 7aL, and knuckles 8aR and 8aL, respectively.

In addition, the vehicle 1 comprises a steering wheel 11, a front wheel steering system 10 for directly steering the right and left front wheels 4R and 4L according to the steering of the steering wheel 11. This front wheel steering system 10 comprises a rack and pinion system having a pinion 13 integrally formed on a steering shaft 12 connected to the steering wheel 11 and supported in a rotatable manner, and a rack 14 engaged with the pinion 13 and mounted so as to be able to move in a reciprocating motion in a width direction of the vehicle. Each end of the rack 14 is connected to the knuckle 7a via a tie rod 15. Therefore, the right and left front wheels 4 can be steered according to the rotation of the steering wheel 11.

The front wheel steering system 10 is provided with an electric power steering (EPS) system 16 that assists the steering of the front wheels 4 in order to reduce manual steering effort. The electric power steering system 16 mainly comprises an electric motor 17 for generating assist force (hereinafter, referred to as EPS torque) according to the steering operation, a power transmitting mechanism 18 for transmitting the EPS torque generated by the electric motor 17 to the steering shaft 12, and an EPS control unit 19 for controlling the drive of the electric motor 17.

The steering shaft 12 is provided with a steering angle sensor 26 mounted thereon for detecting a steering angle of the steering wheel 11 and a steering torque sensor 27 mounted thereon near the pinion 13 for detecting a manual steering torque acting on the pinion 13. A detection signal from the steering torque sensor 27 is inputted into the EPS control unit 19 and is used for steering assist control. Specifically, a base current for the electric motor 17 is calculated based on the steering torque detected by the steering torque sensor 27 and a vehicle speed detected by a vehicle speed sensor 24 described below. The EPS control unit 19 comprises a microcomputer, a ROM, a RAM, a peripheral circuit, an input-output interface, and various drivers, and controls the drive of the electric motor 17 according to the calculated current.

In addition, the vehicle 1 comprises a rear wheel toe angle variable control system 20 configured to individually change the toe angles of the rear wheels 6R and 6L by extending and retracting right and left extensible actuators 21R and 21L each fixed to the vehicle body 2 at a base member end thereof and connected to a rear portion of the knuckle 8a at a movable member end thereof. In addition to the right and left extensible actuators 21R and 21L, the rear wheel toe angle variable control system 20 has a rear wheel toe angle control unit 22 for controlling the actuation of the right and left extensible actuators 21R and 21L, and stroke sensors 23R and 23L for detecting stroke amounts of the right and left extensible actuators 21R and 21L. Detection signals from the stroke sensors 23R and 23L are inputted into the rear wheel toe angle control unit 22, and thus the extensible actuators 21R and 21L are feedback-controlled by the rear wheel toe angle control unit 22 based on the detection signals sent from the stroke sensors 23R and 23L.

The vehicle 1 further comprises an ECU (Electronic Control Unit) 28 for controlling various systems in an integrated manner, a vehicle speed sensor 24 for detecting a speed of the vehicle, a yaw rate sensor 25 for detecting a yaw rate of the vehicle (vehicle behavior), and other various sensors not shown. The ECU 28 is connected to the sensors 23-27, the EPS control unit 19 and the rear the wheel toe angle control unit 22 etc. Detection signals from the sensors 23-27 are inputted into ECU 28 and are used for various control operations of the vehicle.

The ECU 28 calculates a target toe angle for each rear wheel based on various signals inputted thereto and determines a target stroke amount for each of the extensible actuators 21R and 21L, and then sends a drive control signal to the rear wheel toe angle control unit 22 so as to control the toe angle of each rear wheel 6. The rear wheel toe angle control unit 22 comprises a microcomputer, a peripheral circuit and various drivers, and controls the actuation of the extensible actuators 21 based on the drive control signal sent from the ECU 28. Thus, the extensible actuators 21R and 21L each extend or retract according to the corresponding target stroke amount determined by the ECU 28, thereby changing the toe angles of the right and left rear wheels 6R and 6L to the target ones.

According to the vehicle 1 configured as described above, by simultaneously displacing the right and left actuators 21R and 21L in a symmetrical manner, the toe angles of the rear wheels 6R and 6L can be freely controlled and changed in a toe-in or toe-out relationship if appropriate, and by extending one of the right and left actuators 21R and 21L and retracting the other one, the toe angles of the rear wheels 6R and 6L can be changed in a same or opposite phase relationship relative to the front wheels 4. For example, based on motion states of the vehicle 1 detected by various sensors, when the vehicle 1 is accelerating, the rear wheels 6 may be steered in the toe-out relationship, and when the vehicle 1 is decelerating, the rear wheels 6 may be steered in the toe-in relationship, thereby improving the maneuverability of the vehicle 1. In addition, when the vehicle 1 is turning with a high speed, the toe angles of the rear wheels may be changed in the same phase relationship relative to the front wheels, and when the vehicle 1 is turning with a low speed, the toe angles of the rear wheels may be changed in the opposite phase relationship relative to the front wheels, thereby improving the maneuverability of the vehicle 1.

Figure 2:
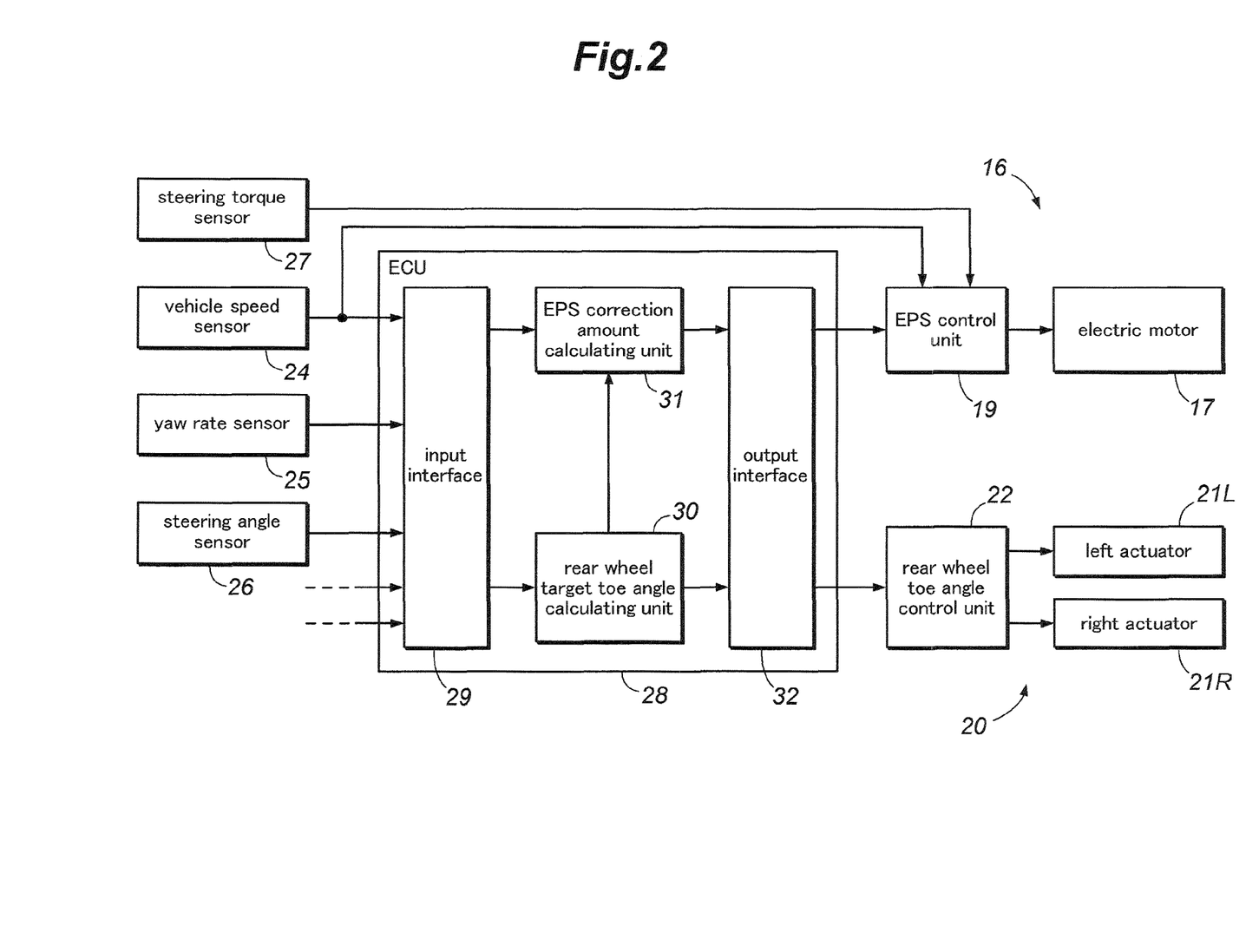
FIG. 2 is a block diagram of the rear wheel steering vehicle of the present invention.

FIG. 2 is a block diagram showing the embodiment of the rear wheel steering vehicle 1 of the present invention equipped with the rear wheel toe angle control system 20. As shown in FIG. 2, the vehicle 1 is equipped with the electric power steering system 16 having the electric motor 17 and the EPS control unit 19, the ECU 28, the rear wheel toe angle variable control system 20 having the right and left actuators 21R and 21L and the rear wheel toe angle control unit 22, and various sensors such as the steering torque sensor 27 and the vehicle speed sensor 24.

The ECU 28 comprises an input interface 29 connected to the vehicle speed sensor 24, the yaw rate sensor 25 and the steering angle sensor 26; a rear wheel target toe angle calculating unit 30 for calculating the target toe angle for each rear wheel based on signals from various sensors; an EPS correction amount calculating unit 31 for calculating an additional correction torque for the EPS control unit 19 based on calculation result from the rear wheel target toe angle calculating unit 30 and signals from various sensors; and an output interface 32 for outputting various calculation results as electric signals.

The EPS control unit 19 calculates control current for the electric motor 17 based on the detection signals from the steering torque sensor 27 and vehicle speed sensor 24 as well as based on the signal of the additional correction torque from the EPS correction amount calculating unit 31, and then controls the drive of the motor 17.

Figure 3:
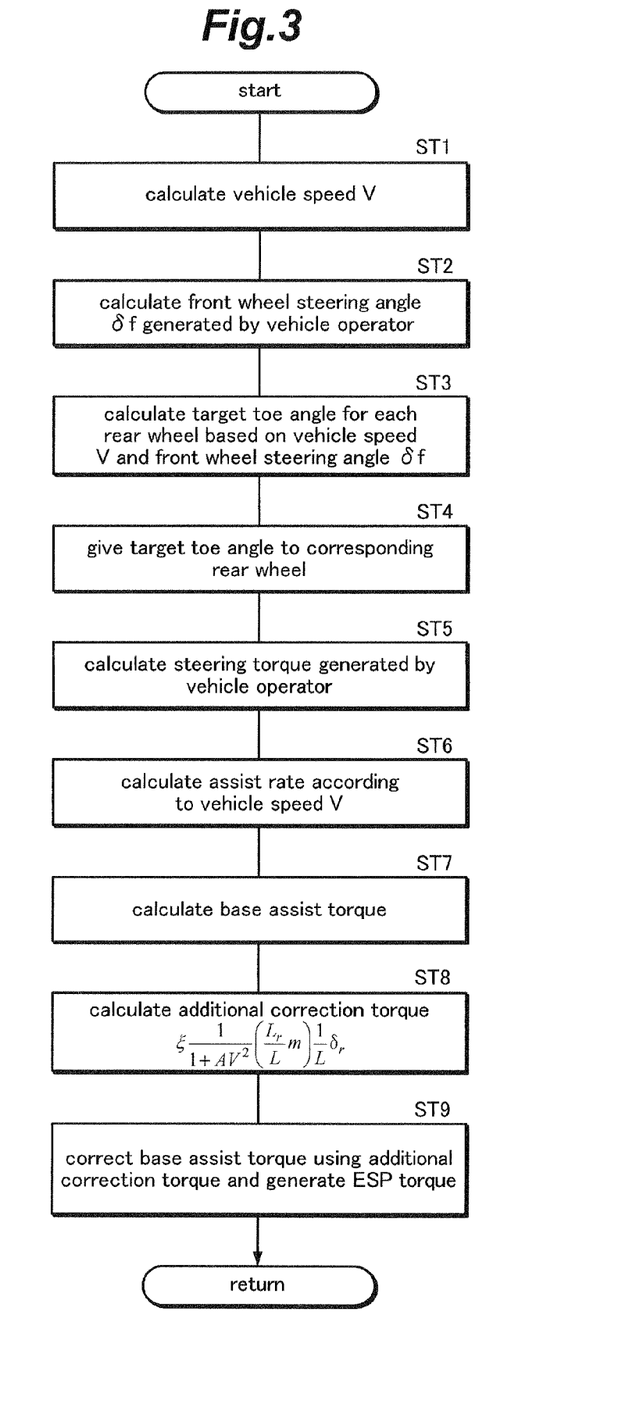
FIG. 3 is a flowchart showing the steps for assisting the front wheel steering.

Next, the front wheel steering assist performed by the electric power steering system 16 of the vehicle 1 is explained with reference to FIG. 3. FIG. 3 is a flowchart showing the steps for assisting the front wheel steering. In the vehicle 1, first, the vehicle speed V is obtained based on the detection result from the vehicle speed sensor 24 (Step 1). Then, the front wheel steering angle $\delta_f$ generated by the steering operation of the vehicle operator is obtained based on the detection result from the steering angle sensor 26 (Step 2). Then, the target toe angle for each rear wheel 6 is calculated based on the vehicle speed V and the front wheel steering angle $\delta_f$ (Step 3) at the rear wheel target toe angle calculating unit 30, and is given to the rear wheel by actuating the corresponding extensible actuator 21 via the rear wheel toe angle control unit 22 (Step 4).

Next, at the EPS control unit 19 of the vehicle 1, the steering torque generated by the operation of the vehicle operator is calculated based on the detection result from the steering torque sensor 27 (Step 5), and an assist rate required according to the vehicle speed V is calculated (Step 6). Next, the base assist torque required to be generated by the electric power steering system 16 is calculated based on the steering torque and the assist rate (Step 7). Next, an additional correction torque, which is explained in detail below, is calculated at the EPS correction amount calculating unit 31 (Step 8), and then the electric motor 17 is driven so as to generate an EPS torque obtained by adding the additional correction torque to the base assist torque (Step 9), and then the above steps are repeated.

Figure 4:
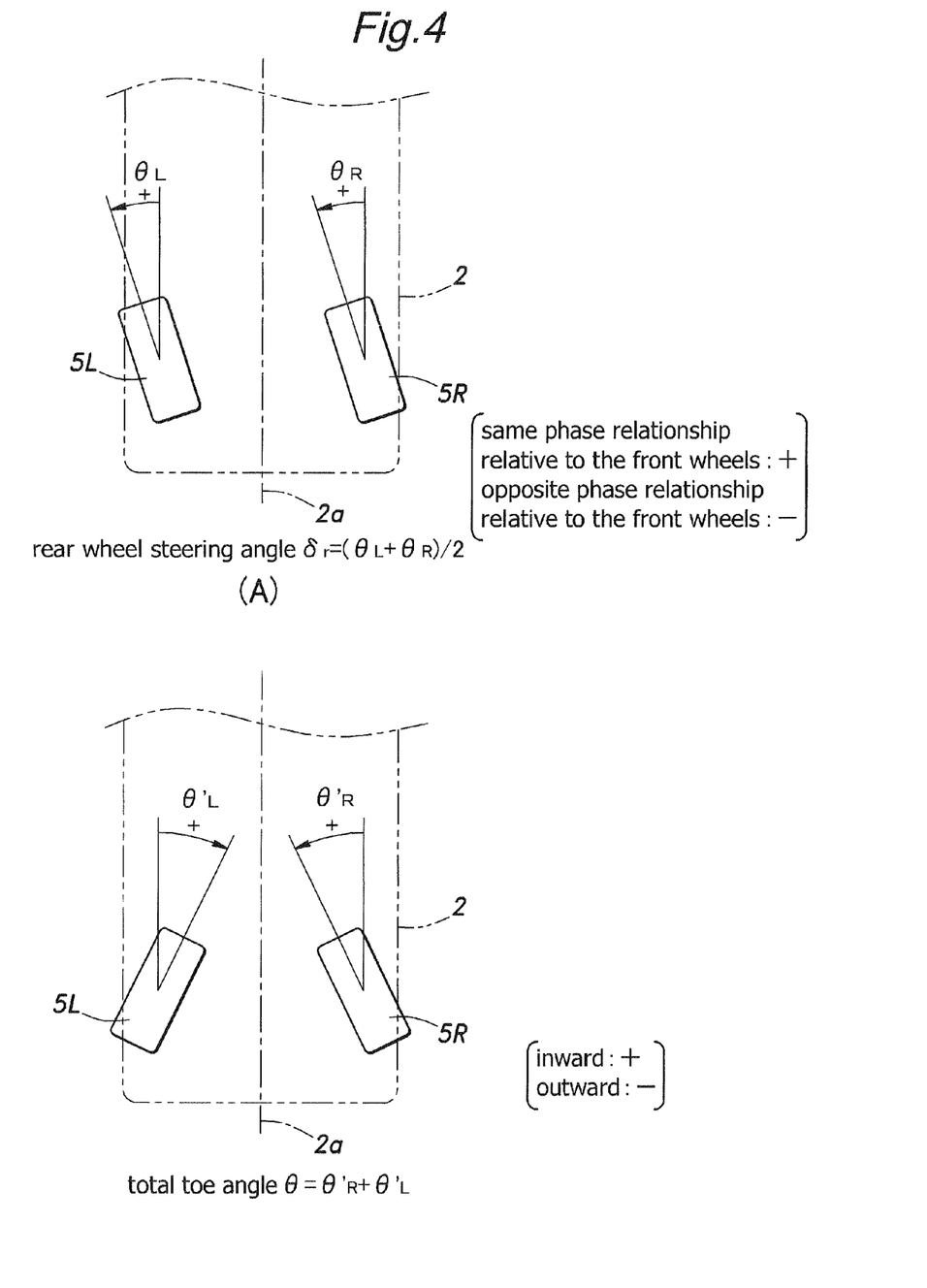
FIG. 4 is a diagram illustrating rear wheel toe angles.

Next, the additional correction torque, which is calculated according to the target toe angles of the rear wheels 6, is explained below. The effect of a rear wheel steering angle $\delta_r$ on a vehicle slip angle $\beta$ and a yaw rate $\gamma$ can be expressed as follows:

$$\{mVs+(K_f+K_r)\}\beta+\{mV(L_fK_f-L_rK_r)/V\}\gamma=K_r\delta_r \quad (1)$$

$$(L_fK_f-L_rK_r)\beta+\{Is+(L_f^2K_f+L_r^2K_r)/V\}\gamma=-L_rK_r\delta_r \quad (2)$$

wherein, m: vehicle mass, V: vehicle speed, s: Laplace operator, $K_f$: front wheel cornering power, $K_r$: rear wheel cornering power, $\beta$: vehicle slip angle, $L_f$: distance between the front axle and gravitational center, $L_r$: distance between the rear axle and gravitational center, $\gamma$: yaw rate, $\delta_r$: rear wheel steering angle, I: yaw moment of inertia of the vehicle. As shown in FIG. 4(A), the rear wheel steering angle $\delta_r$ is an average value of angles $\theta_R$ and $\theta_L$, which are each the angle of the longitudinal axis of the corresponding rear tire contact surface with respect to the longitudinal axis 2a of the vehicle, when the toe angles of the right and left rear wheels have been changed in the same direction with respect to the longitudinal axis 2a of the vehicle, and thus is expressed as $\delta_r=(\theta_R+\theta_L)/2$. In this case, $\theta_R$ and $\theta_L$ are positive values ("+") if the rear wheels have been steered in the same phase relationship relative to the front wheels, or negative values ("−") if the rear wheels have been steered in the opposite phase relationship to the front wheels.

The above equations (1) and (2) can be expressed as follows so as to solve them for the steady state values:

$$\beta=\{1/(1+AV^2)\}\{1+(m/L)(L_r/L_fK_f)V^2\}(L_r/L)\delta_r \quad (3)$$

$$\gamma=\{1/(1+AV^2)\}(V/L)(-\delta_r) \quad (4)$$

wherein, A: stability factor, L: wheelbase. Therefore, the effect of the rear wheel steering angle $\delta_r$ on a front wheel slip angle $\beta_f$ can be expressed as follows.

$$\beta_f=\beta+(L_f/V)\gamma=\{1/(1+AV^2)\}(L_r/L)m(1/LK_f)V^2\delta_r \quad (5)$$

The steering moment "$\xi \cdot K_f \cdot \beta_f$" can be expressed as follows:

$$\xi\{1/(1+AV^2)\}(L_r/L)m(1/L)V^2\delta_r \quad (6)$$

wherein $\xi$: pneumatic trail+caster trail.

The effect of the total toe angle $\theta$ on the vehicle slip angle $\beta$ and the yaw rate $\gamma$ is explained below. The total toe angle $\theta$ generates an additional yaw moment expressed by the following formula:

$$-K \cdot K_r \cdot \alpha_y \cdot L_r \cdot \theta \quad (7)$$

wherein, K: load displacement coefficient (for its details, see Japanese patent application laid open (kokai) 2008-055921), $\alpha_y$: lateral acceleration, $\theta$: total toe angle. As shown in FIG. 4(B), the total toe angle $\theta$ refers to the sum of angles $\theta'_R$ and $\theta'_L$, which are each the angle of the longitudinal axis of the corresponding rear tire contact surface with respect to the longitudinal axis 2a of the vehicle, when the toe angles of the rear wheels have been changed in different directions with respect to the longitudinal axis 2a of the vehicle 2 (i.e., when the toe angles of right and left rear wheels 6 have been changed in the toe-in or toe-out relationship), and is expressed as $\theta=\theta'_R+\theta'_L$. In this case, the angles $\theta'_R$ and $\theta'_L$ are positive values ("+") if the rear wheels have been steered in toe-in relationship (inward), or negative values if the rear wheels have been steered in toe-out relationship (outward). The formula (7) indicates that the total toe angle $\theta$ generates a lateral force expressed as "$-K \cdot K_r \cdot \alpha_y \cdot \theta$" at the rear wheels 6. By comparing this formula with equations (1) and (2), one can appreciate that the "$\delta_r$" in equations (1) and (2) can be replaced by "$K \cdot \alpha_y \cdot \theta$".

Accordingly, the additional correction torque can be expressed as follows.

$$\xi \cdot \{1/(1+AV^2)\}\{(L_r/L)m\}(1/L)\delta_r \quad (8)$$

$$\xi \cdot \{1/(1+AV^2)\}\{(L_r/L)m\}(1/L)K\alpha_y\theta \quad (9)$$

Thus, when the toe angles of the rear wheels 6 have been changed, the EPS control unit 19 corrects the base assist torque using the additional correction torque determined by formula (8) according to the rear wheel steering angle $\delta_r$ (i.e., the additional correction torque which is proportional to the rear wheel steering angle $\delta_r$) or the additional correction torque determined by formula (9) according to the total toe angle θ (i.e., the additional correction torque which is proportional to the total toe angle θ), and thus the operator of the vehicle 1 will have the same steering feeling as when driving a vehicle that does not steer rear wheels (hereinafter, a usual vehicle) even when the toe angles of the rear wheels 6 have been changed. It should be understood that even if the additional correction torques represented by formulas (8) and (9) are not strictly proportional to the rear wheel steering angle $\delta_r$ and the total toe angle θ, respectively, the steering feeling caused by the vehicle 1 can be improved to that of a usual vehicle if the additional correction torques are increased and decreased in an almost proportional relationship with the rear wheel steering angle $\delta_r$ and total toe angle θ.

Accordingly, when the toe angles of the right and left rear wheels 6 (rear wheel steering angle $\delta_r$) have been changed in the same phase relationship relative to the right and left front wheels 4, the electric power steering system 16 increases the EPS torque compared to when no toe angle is given to the right and left rear wheels by adding a positive additional correction torque, and when the toe angles of the right and left rear wheels 6 (rear wheel steering angle $\delta_r$) have been changed in the opposite phase relationship relative to the front wheels 4, the electric power steering system 16 decreases the EPS torque compared to when no toe angle is given to the right and left rear wheels by adding a negative additional correction torque, thereby approximating the steering feeling caused by the vehicle 1 to that of a usual vehicle. In addition, when the toe angles of the right and left rear wheels 6 have been changed in the toe-in relationship, the electric power steering system 16 increases the assist force compared to when no toe angle is given to the right and left rear wheels 6 by adding a positive additional correction torque, and when the toe angles of the right and left rear wheels have been changed in the toe-out relationship, the electric power steering system 16 decreases the assist force compared to when no toe angle is given to the right and left rear wheels 6 by adding a negative additional correction torque, thereby approximating the steering feeling caused by the vehicle 1 to that of a usual vehicle. Furthermore, the electric power steering system 16 increases the extent of the increase or decrease in the EPS torque according to the increase in the absolute values of the toe angles of the right and left rear wheels (i.e., the absolute value of the rear wheel steering angle $\delta_r$ or that of the total toe angle θ), and thus the operator of the vehicle 1 will experience the same steering feeling as when driving a usual vehicle.

LIST OF NUMERALS 1 vehicle
2 vehicle body
4 front wheel
6 rear wheel
10 front wheel steering system
11 steering wheel
12 steering shaft
16 electric power steering system
17 electric motor
18 power transmitting mechanism
19 EPS control unit
20 rear wheel toe angle variable control system
22 rear wheel toe angle control unit

The invention claimed is:

1. A rear wheel steering vehicle comprising:
a steering wheel for steering right and left front wheels;
a power steering system for providing an assist force so as to assist steering of the right and left front wheels according to operation of the steering wheel; and
a rear wheel toe angle variable control system for changing toe angles of right and left rear wheels in a same or different direction relative to a longitudinal axis of the vehicle or in a toe-in or toe-out relationship by individually controlling actuation of right and left actuators mounted for the right and left rear wheels, respectively,
wherein when the rear wheel toe angle variable control system has changed the toe angles of the right and left rear wheels in the toe-in relationship, the power steering system increases the assist force compared to when no toe angle is given to the right and left rear wheels, and when the rear wheel toe angle variable control system has changed the toe angles of the right and left rear wheels in the toe-out relationship, the power steering system decreases the assist force compared to when no toe angle is given to the right and left rear wheels.

2. The rear wheel steering vehicle according to claim 1, wherein the power steering system increases an extent of the increase or decrease in the assist force according to increase in a sum of absolute values of the toe angles of the right and left rear wheels.

3. The rear wheel steering vehicle according to claim 1, wherein when the rear wheel toe angle variable control system has changed the toe angles of the right and left rear wheels in the same direction relative to the longitudinal axis of the vehicle, the power steering system increases the assist force compared to when no toe angle is given to the right and left rear wheels, and when the rear wheel toe angle variable control system has changed the toe angles of the right and left rear wheels in the opposite direction relative to the longitudinal axis of the vehicle, the power steering system decreases the assist force compared to when no toe angle is given to the right and left rear wheels.

4. The rear wheel steering vehicle according to claim 3, wherein the power steering system increases an extent of the increase or decrease in the assist force according to increase in absolute values of the toe angles of the right and left rear wheels.

* * * * *

UNITED STATES PATENT AND TRADEMARK OFFICE
CERTIFICATE OF CORRECTION

| | | |
|---|---|---|
| PATENT NO. | : 8,186,477 B2 | |
| APPLICATION NO. | : 12/742352 | |
| DATED | : May 29, 2012 | |
| INVENTOR(S) | : Yutaka Horiuchi | |

It is certified that error appears in the above-identified patent and that said Letters Patent is hereby corrected as shown below:

<u>Title Page</u> -

Item (73), Assignee, please delete "Honta Motor Co., Ltd., Tokyo (JP)" and substitute therefor
-- Honda Motor Co., Ltd., Tokyo (JP) --.

Signed and Sealed this
Ninth Day of October, 2012

David J. Kappos
*Director of the United States Patent and Trademark Office*